United States Patent

[11] 3,616,053

| [72] | Inventor | Wolfgang B. Fahrenbach<br>Oakland, Calif. |
|---|---|---|
| [21] | Appl. No. | 16,650 |
| [22] | Filed | Mar. 5, 1970 |
| [23] | | Division of Ser. No. 761,242, Sept. 20, 1968, Pat. No. 3,546,771. |
| [45] | Patented | Oct. 26, 1971 |
| [73] | Assignee | Stryco Manufacturing Co.<br>San Francisco, Calif. |

[54] PAPER BACK LATH MAKING MACHINE
12 Claims, 20 Drawing Figs.

[52] U.S. Cl. .................................................. 156/380,
29/208 F, 29/429, 219/87, 219/102
[51] Int. Cl. .......................................................... B32b 51/20,
B23k 9/02, B23p 19/00
[50] Field of Search ........................................... 156/380,
309, 582; 29/429, 208 F; 219/87, 102

[56] References Cited
UNITED STATES PATENTS

| 1,210,848 | 1/1917 | Scammell | 29/429 X |
| 2,987,081 | 6/1961 | Stone | 140/10 |
| 3,225,433 | 12/1965 | Anspach | 29/429 |
| 2,895,535 | 7/1959 | Ono | 156/380 |
| 3,318,751 | 5/1967 | Ungerer et al. | 156/380 |

Primary Examiner—Benjamin A. Borchelt
Assistant Examiner—J. J. Devitt
Attorney—Boyken, Mohler, Foster & Schwab ABSTRACT: A machine for making paperbacked wire lath sheets from continuous paper strips and continuous wires, the latter being in crossing relation at opposite sides of said strip and welded together at their crossing points through slots in said strip. The paper and wires are brought together on the outer periphery of a revolvable drum that includes welding electrodes, and aligning and positioning means in cooperative relation to the slots in the paper and wires for insuring the desired positioning of the wires at their crossing points for welding together through said slots.

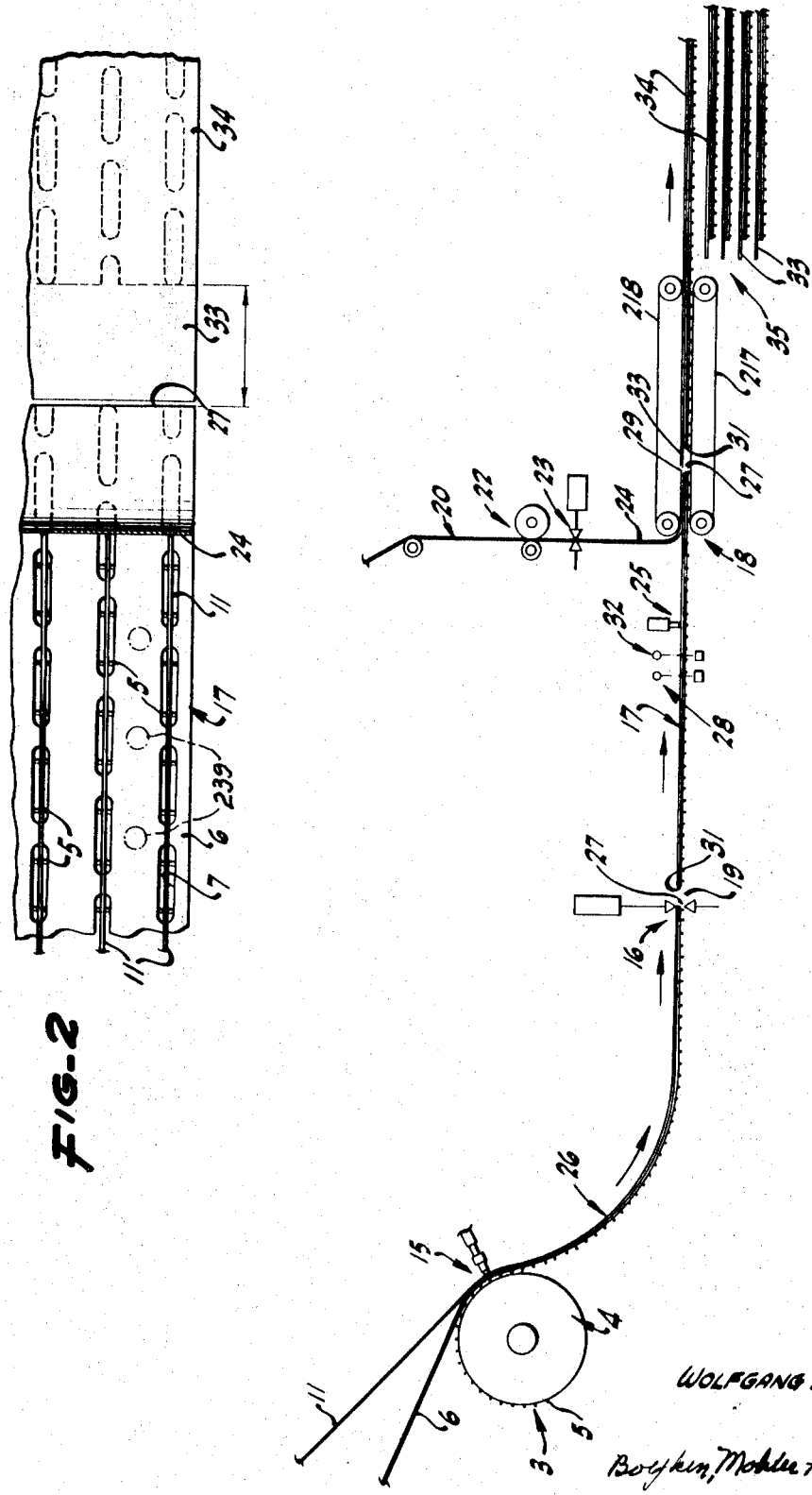

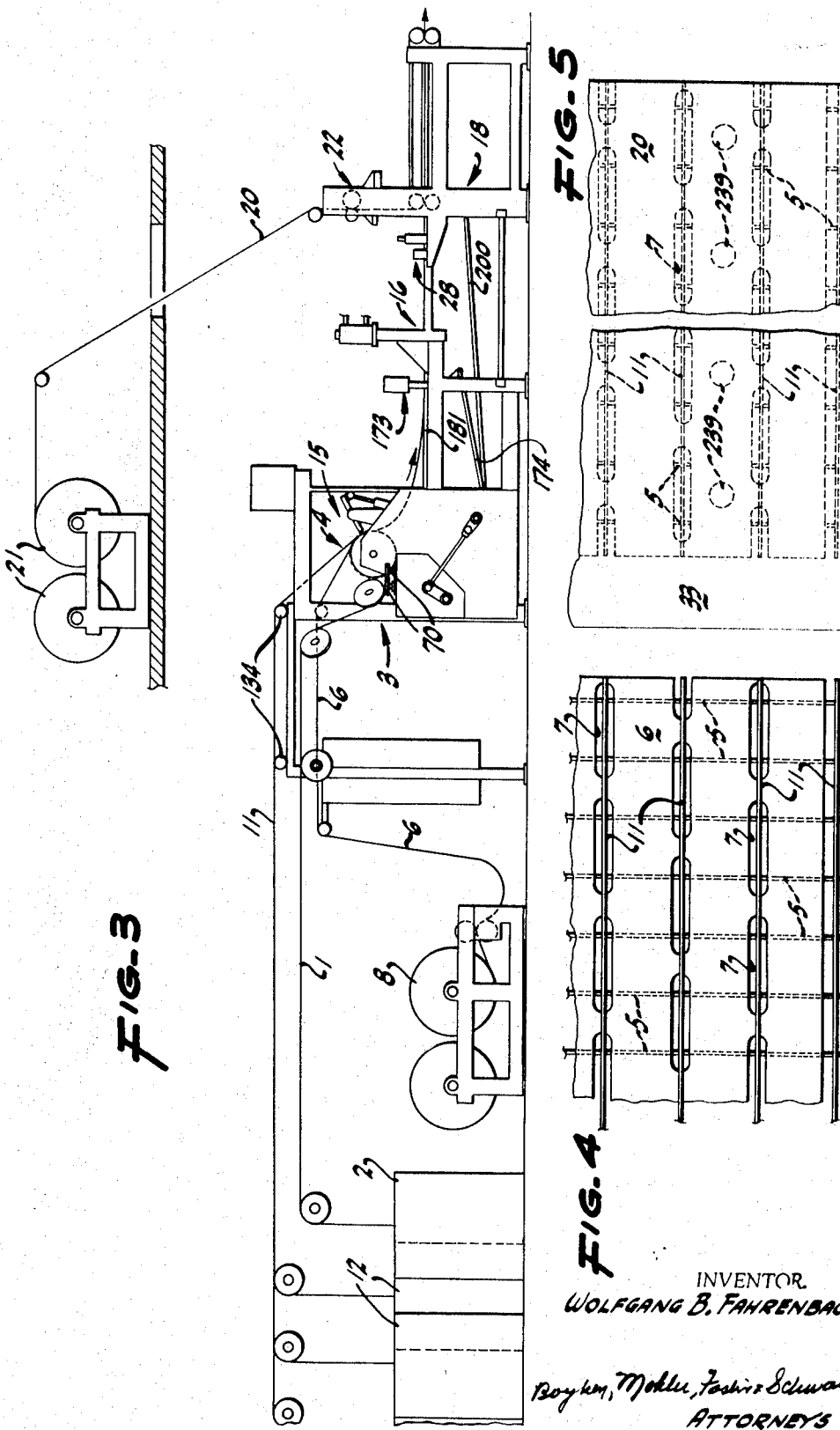

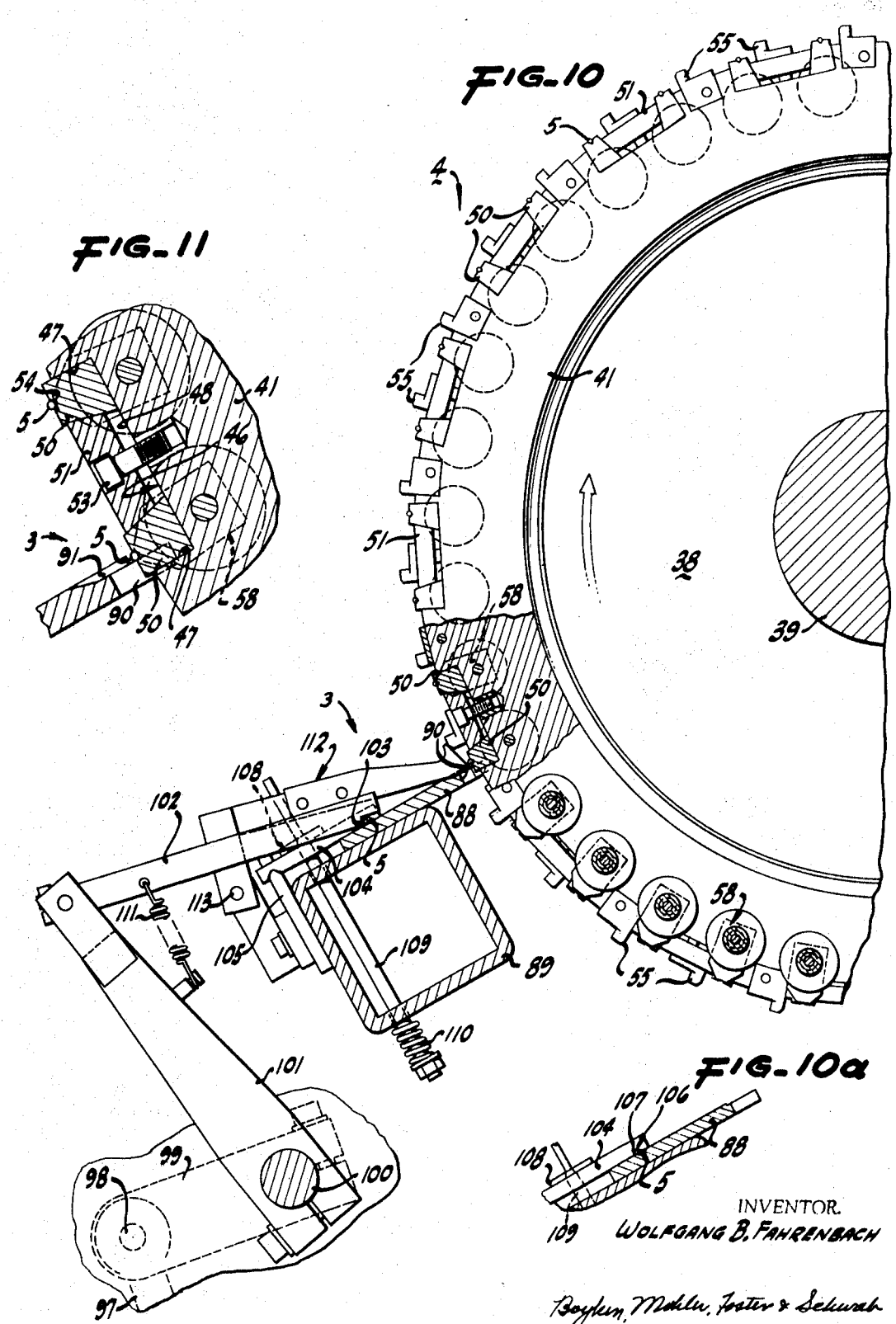

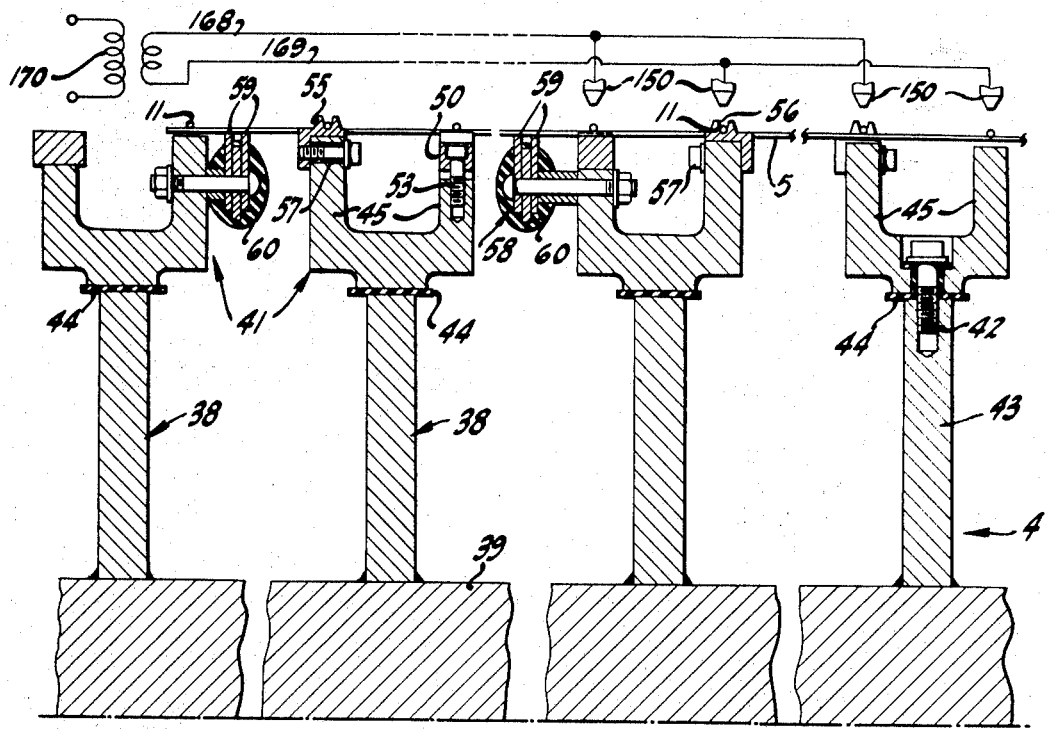
FIG-12
FIG-19
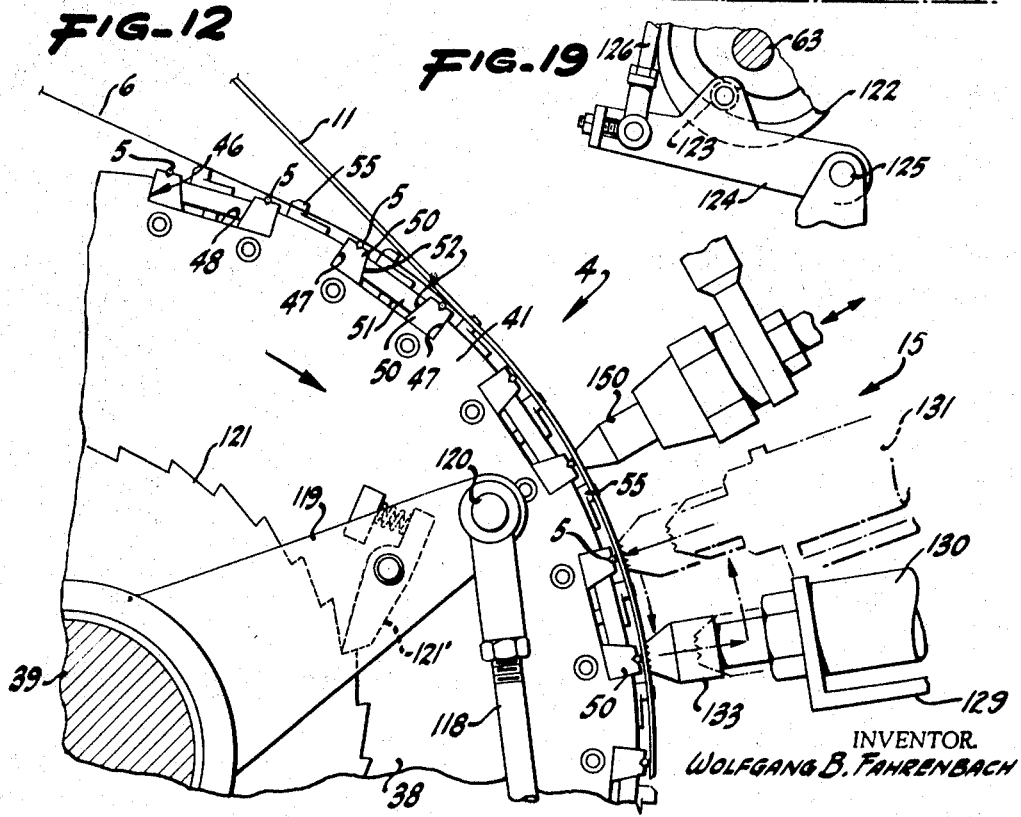
FIG-13

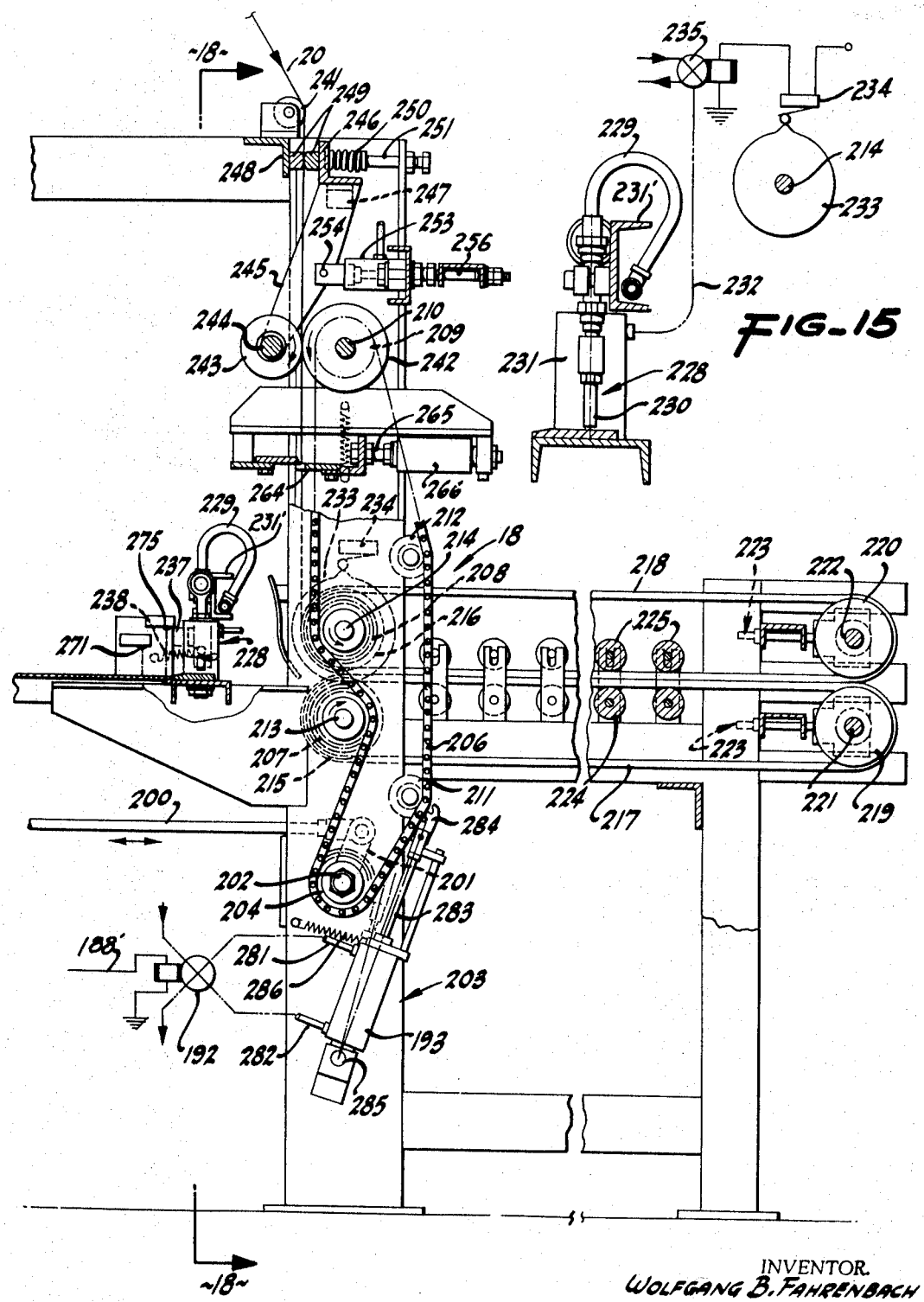

INVENTOR.
WOLFGANG B. FAHRENBACH

ATTORNEYS 3,616,053

PAPER BACK LATH MAKING MACHINE

SUMMARY OF THE INVENTION

This is a division of copending application Ser. No. 761,242, filed Sept. 20, 1968 now Pat. No. 3,546,771 issued Dec. 15, 1970.

Heretofore, machines for making paperbacked wire lath as above described, have been capable of producing lath from sheets of paper precut to the desired length, and having parallel rows of elongated slots in longitudinal alignment longitudinally of the direction of movement of the sheets, In such machines, longitudinal wires are positioned on a horizontal bed and the sheets are then positioned over said longitudinal wires. Said sheets, being precut, are separately laid on said bed and are then moved over said wires. This requires picking up each sheet and positioning it on said bed and moving it toward said prelaid wires. The longitudinal wires should extend longitudinally of the slots and rows of the latter, and centrally between the sides of the slots in each row. Cross wires are then positioned perpendicular to said rows of slots and over the paper and equally spaced from the ends of the respective slots.

The "longitudinal" wires are the ones extending longitudinally of the rows of slots, and the "cross wires" are those extending perpendicularly to the longitudinal wires.

The uniformly strip positioning of the longitudinal and cross wires relative to the slots in the paper, by the above method, for welding said wires together through the slots, has been a constant problem in prior machines intended to produce lath of the above-described type, and one of the objects of this invention is the provision of a machine, and method, that overcomes this problem.

The required use of precut paper in prior machines has also been one of the requirements that slows the operation of the machine and that contributes to the problem of inaccuracy in positioning the slots properly relative to the wires, and another of the objects of this invention is the provision of means for forming lath in pieces of different lengths from a continuous strip of paper and from continuous wires.

In prior machines, the electrodes for welding the longitudinal and cross wires together at their crossing points to form the metal fabric have consisted of a single row of electrodes respectively above and below the crossed wires, each electrode requiring water cooling, and each subject to appreciable wear, and difficulty of replacement. One object of the present invention is the provision of structure in which the electrodes at one side of the crossed wires do not require artificial cooling, as by water, and which electrodes are easy to replace and are subjected to less wear than heretofore.

Another object of the invention is the provision of a structure in which the feeding of back paper onto the previously formed paper-mesh assembly, in correct relation to said assembly, to provide a correct relationship between the back sheet, and the paper-mesh assembly, will be maintained automatically irrespective of differences in the length of the finished product.

By "paper-mesh assembly" is meant the assembly of a sheet of paper and the longitudinal and cross wires at opposite sides of such sheet. The present lath product may include a back sheet secured over one side of said assembly or the paper back lath, in which plaster applied to the lath at the side opposite to the back sheet will cover the longitudinally extending wires and pass through the slots to enclose the bond with the cross wires at their crossing points and between the latter, will be held in position by the back sheet. Generally, such paper back lath, apart from the back sheet, is shown in U.S. Pat. No. 2,408,781 of Oct. 8, 1946 to A. C. Karelius.

Other objects and advantages will appear in the description and drawings.

BRIEF DESCRIPTION OF DRAWINGS

FIG. 1 is a diagrammatic view showing the several steps in the formation of the finished paper back mesh.

FIG. 2 is a fragmentary plan view of a portion of the product adjacent the finished stage, severed from the product at the point where the back paper is applied, showing the overhang of the back paper on the portion of the finished sheet at the right-hand portion, and the lath assembly, without the back sheet being shown at the left-hand portion.

FIG. 3 is a simplified side elevational view showing, in single lines, the wires and paper being fed to the machine, and the machine, generally, including certain operating elements, including certain control means diagrammatically illustrated.

FIG. 4 is a fragmentary top plan view showing a portion of the product before the cover paper is attached.

FIG. 5 is a fragmentary top plan view of a sheet with the cover paper attached.

FIG. 10 is a fragmentary, part sectional view of a portion of the drum in FIGS. 1, 3, 6 and 8 showing the means for feeding the cross wires to the drum.

FIG. 10a is a fragmentary, enlarged view of a portion of FIG. 10.

FIG. 11 is an enlarged, fragmentary view of a portion of FIG. 10, showing the wire positioner, electrodes and magnets, the latter being in dotted lines.

FIG. 12 is an enlarged, fragmentary, cross-sectional view showing several of the electrodes and the electrical circuit therefor, and also showing several of the magnets for the cross wires.

FIG. 13 is a fragmentary view of a portion of the drum showing electrodes and clamps for the mesh wires, and also showing means for revolving the drum.

FIG. 14 is a side elevational view, partly in cross section, showing the gluer, advancing mechanism and cutter for the back sheet, and schematically showing the control means for the portion of the advancing mechanism for providing an overhang of the back sheet.

FIG. 15 is a fragmentary, semischematic view showing the control means for the gluer shown in FIG. 14.

FIG. 19 is a fragmentary view of one of the cams and followers for controlling the movements of the wire clamps shown in FIG. 13.

DETAILED DESCRIPTION OUTLINE OF THE ENTIRE APPARATUS AND METHOD

Figure 6:
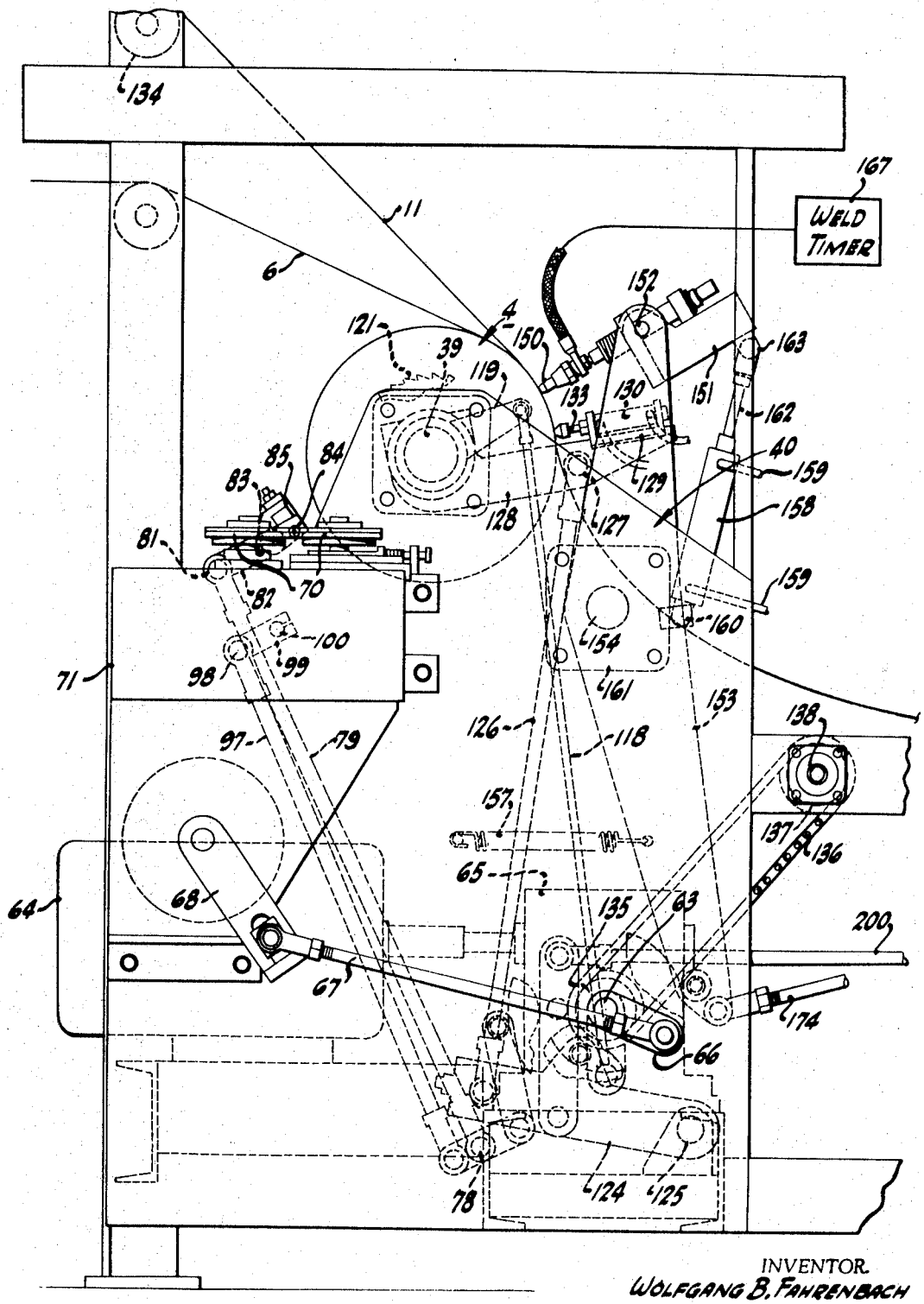
FIG. 6 is a side elevational view of the machine for forming the wire mesh and for positioning the mesh wires at opposite sides of the paper held between the wires.

A preliminary reference to FIGS. 1, 3 will clarify the steps of the method that is performed by the apparatus from the beginning to the end. Details of structure of the apparatus, including the specific numbering of details of mechanical elements, will follow the description of FIGS. 1, 3.

a continuous wire 1 (FIG. 3) is drawn from a continuous source 2 (FIG. 3) to a cutting and feeding station 3 (FIGS. 1,3) that is adjacent to one side of what may be called a rotary drum 4. The end portion 5 (FIG. 1) of said wire is positioned across the side of said drum at said station 3, cut off, and held against said side by magnets on the drum for being carried around the drum as the latter is intermittently rotated in one direction. The lengths 5 of wire, so cut from wire 1 will hereafter be called "cross wires" as they will form the cross wires of the wire mesh that is to be formed.

Drum 4 is intermittently rotated about its axis predetermined, uniform distances, each equal to the distance between adjacent cross wires, and as the drum is so rotated, a strip of paper 6, (FIGS. 1, 3), having parallel, spaced rows of slots 7 (FIGS. 2, 4) extending longitudinally of said strip, is drawn from a continuous source, such as a roll 8 (FIG. 3) and is laid against the outer peripheral side of drum 4 over the cross wires 5 that, in turn, are releasably held against said drum by said magnets.

Radially outwardly extending projections on the outer side of said drum extend through the leading ends of said slots, each being centrally grooved in a direction circumferentially of said drum, which projections both position the slots in the paper for correct and uniform exposure of the cross wires therethrough and secure in said grooves longitudinally extending wires centrally positioned between the sides of each slot at right angles to the cross wires.

Said longitudinal wires, designated 11 (FIG. 1, 3), are continuous, being drawn from a plurality of continuous sources 12 (FIG. 3), there being one wire 11 for each slot 7. The term "longitudinal wires" distinguishes wires 11 from the cross wires 5.

The slots 7 of the adjacent rows are preferably staggered relative to each other (FIG. 2) so that each cross wire will extend across opposite ends of the slots in adjacent rows.

The drum 4 has annular rows of equally spaced contact electrodes (later numbered and described in detail) around its periphery and at a welding station 15 (FIGS. 1, 3), an oscillatably supported outer electrode is outwardly of said drum opposite each contact electrode on the drum.

Between each intermittent rotation of the drum, the outer electrode at the welding point moves into firm engagement with the wires 5 and 11 at their crossing points at slots 7, welding them together. During each rotation of the drum the wires are clamped against the drum. Thus, the paper 6 is held between wires 5, 11 by the welds and the wire mesh is formed.

The paper strip 6 with the longitudinal and cross wires respectively at opposite sides thereof, may be termed the "paper-mesh assembly." This paper-mesh assembly is intermittently advanced longitudinally of the strip 6 and wires 11 a distance equal to the total of a predetermined number of successive mesh distances, and at the end of each such total distance a shear is actuated at a shearing station 16 (FIGS. 1, 3) to sever the paper-mesh assembly transversely of the strip thereof.

The leading portion 17, so severed from the paper-mesh assembly, is of the correct length, and this length may be varied by an operative connection between a counter at the drum and cutter, the counter being actuated at each intermittent advance of the paper-mesh assembly, and the cutter being actuated at the end of a total predetermined number of such advanced. By a dial at the counter, any desired length of the paper-mesh assembly, measured by total mesh distances, may be severed from the paper-mesh assembly at the shearing station 16.

The leading portion 17, immediately upon severance at hearing station 16, is advanced a short distance by an accelerated movement of a drive means 18 (FIGS. 1, 3) to space the trailing end of the portion 17 from the leading end of the continuous remainder a distance 19 (FIG. 1) which space may be approximately 3 inches or more, or less, after which the said continuous remainder and said leading portion resume their movement at the same rate of speed away from drum 4, and this spacing 19 will remain the same irrespective of whether the control of the cutter at the shearing station is set for longer or shorter portions 17.

To complete each paper-mesh assembly 17, a back paper 20 is to be positioned over and glued to the paper 6 of each paper-mesh assembly 17. Such back paper is drawn from a continuous source 21 thereof (FIG. 3) by a driving means 22, and past a power-actuated shear 23 (FIG. 1) that severs the leading portion 24 (FIG. 1) of the continuous strip 20 from the remainder, which leading portion will be of a length for positioning on each paper-mesh assembly so as to extend from the leading edge of each paper-mesh assembly 17 to beyond the trailing edge of each such assembly 17 a distance equal to approximately the width of space 19. Each back paper section 24 is to be glued to the paper 5 of each paper-mesh assembly 17 in the aforesaid position.

Prior to the portion 17 of the paper-mesh assembly reaching the driving means 18, glue is applied to the paper 5 of each such assembly at predetermined points between the rows of slots 7 by a plurality of glue applicators at a gluing station 25 (FIG. 1). Glue is so applied between intermittent movements of the portion 17, thus when said portion reaches driving station 18, and the back paper 24 is positioned over said portion, the back paper 24 will be glued onto portion 17.

After the cutter at shearing station 16 has performed a cut to form the leading edge 27 (FIG. 1) of a portion 17, and after shear at shearing station 23 has performed a cut to form the leading edge 29 (FIG. 1) of a back paper 24, the leading edge 27 of portion 17 will pass a first sensing station 28 where photocell or sensor is operatively connected with the driving means 22 to drive the back paper at a rate of speed so that the leading edge 29 (FIG. 1) thereof will be aligned with or in register with the leading edge 27 of the paper-mesh assembly for engagement of said assembly and back paper by driving means 18, where the back paper 24 and the mesh assembly portion 17 will be driven together, and which driving means also presses the back sheet and paper-mesh assembly for firmly gluing the back sheet on the assembly.

The short accelerated forward movement of the assembly 17, and paper 24, at station 18, after the cutter at shearing station 16 has severed a portion 17 from the remainder 26, also moves the back paper 24 with the portion 17 so as not to disturb the register between the leading edge of the back paper 24 and the leading edge of the paper-mesh assembly, and creates the space 19 between the trailing edge 31 (FIG. 1) of the portion 17 and the leading edge 27 of the paper-mesh assembly that is to follow portion 17.

Upon the trailing edge 31 of the portion 17 that has been cut from the remainder 26, reaching a second sensing cell at station 32 as the paper-mesh assembly moves from left to right (FIG. 1), an operative connection between said second sensor at said station 32 such as photoelectric cell, will effect actuation of shear 23 for severing back strip 24 from continuous remainder 20 at a point at which there will be a surplus 33 (FIGS. 1, 2) of said back sheet on the portion 17 when the paper-mesh assembly and said back sheet are advanced with the back sheet 24 over said assembly, and with its leading edge even with the leading edge of the portion 17. This surplus is an extension of the back sheet on the finished lath.

Each finished lath 34 includes an extension 33, and such lath may be stacked or otherwise delivered at the station 35.

In the event lath, such as shown in the aforesaid U.S. Pat. No. 2,408,781 is desired, independently of a back sheet, such lath is provided at the point preceding the sensing station 28.

ROTARY DRUM

Drum 4 (FIGS. 10–13) comprises a row of wheels 38 (FIG. 12) that are rigid on a central shaft 39, which shaft, in turn, is rotatably supported by bearings carried on frame 40 (FIG. 6).

Each wheel 38 comprises an outer annular rim 41 (FIGS. 10–13) secured by screws 42 (FIG. 12) to a web 43 that, in turn, is rigid on shaft 39. Each rim is electrically insulated at 44 from web 43 and from screws 42, and each rim is in the form of an outwardly opening annular channel extending circumferentially of the rim, providing a pair of spaced, opposed, parallel annular walls 45 (FIG. 12) of substantial thickness.

The walls 45 of each rim are formed with equally spaced, outwardly opening, corresponding recesses 46 (FIG. 13) each recess being elongated of each wall and having parallel end surfaces 47 and a bottom surface 48 at a right-angle to said end surfaces ((FIG. 13). A pair of electrodes 50 is in each recess 46 (FIG. 11) with the electrodes of each pair spaced apart and tightly held against said end surfaces 47 by a bridge piece 51. The electrodes of each pair have divergently outwardly extending adjacent, opposed surfaces 52 and the ends of each bridge piece 51 have surfaces complementary to said adjacent surfaces; hence, each bridge piece 51 functions similar to a wedge, and a screw 53 (FIGS. 11, 12) extends through each bridgepiece centrally between its ends and into rim 41 for drawing the bridgepiece into tight engagement with said electrodes for holding the latter tightly against said end surfaces 52 and for removably securing said electrodes in recesses 46. Upon loosening a screw 53 the electrodes 50 held thereby may be slipped laterally of the wall 45 out of the recess 46 for replacement without removing the screw.

The center-to-center spacing of electrodes 50 around each rim is equal to the 1.5-inch spacing between cross wires 5 that are held against the drum, and the center-to-center spacing of the adjacent walls 45 of each adjacent pair of electrodes is 2. The positions of the cross wires are indicated by broken lines 5' in FIG. 8. It is to be understood that the invention is not to be considered as limited to these dimensions.

The radially outwardly facing surfaces of the electrodes 50 are transversely grooved at 54 (FIG. 8) for receiving therein the cross wires 5, with the latter projecting radially outwardly of each groove so as to make positive contact with the longitudinal wires 11 to be positioned over the cross wires. The positions of the longitudinal wires are indicated by broken lines 11' in FIG. 8.

Secured to certain of the rims 41 in a plurality of said rows thereof, are hooks 55 (FIGS. 8, 10), each having a central groove 56 for receiving a longitudinal wire. Said hooks 55 are quite important, as they accurately position the slots 7 in paper 6 with respect to both the cross wires 5 and longitudinal wires 11. The wires 11 will run quite straight, although the sides of grooves 56 (FIG. 12) extend divergently outwardly relative to the axis of the drum 4 and will guide the wires 11 to the bottom of the groove and to positions centrally between the side edges of slots 7 in the event wires 11 should be misaligned.

The hooks 55 are spaced between pairs of the electrodes and are positioned to extend through slots 7 to engage the leading edges of said slots, and a screw 57 (FIG. 12) extending through one of the channel walls 45 secures each hook in position.

Figure 8:
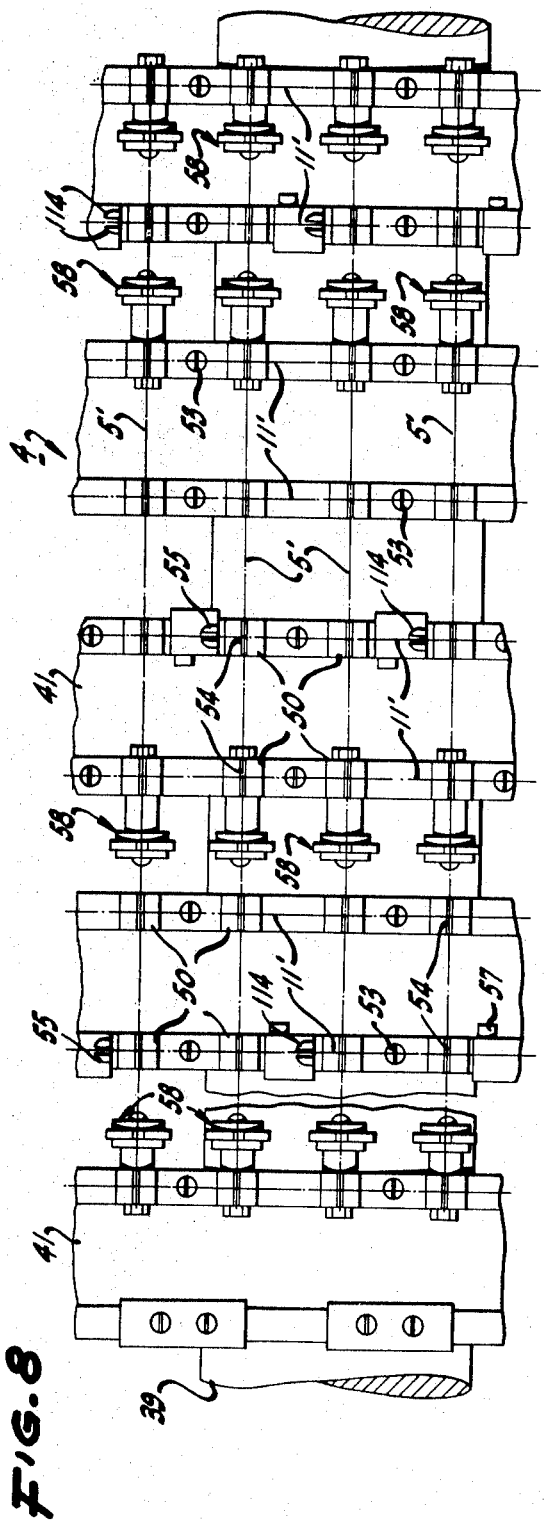
FIG. 8 is an enlarged, fragmentary, elevational view of a portion of the drum showing the electrodes, magnets, paper and wire positioning elements.

Adjacent to each electrode in certain of said rows, and in a position spaced between adjacent pairs of said rows, is a permanent magnet 58 (FIGS. 8, 10–12) having positive and negative tips 59 (FIG. 12) projecting from a body 60 of rubber or other insulation material molded thereon. Said tips are adapted to engage the cross wires 5 at the feed station 3 for said cross wires 5 (FIGS. 1, 10, 11), for holding the cross wires in the grooves 54 in electrodes 50 when said cross wires are moved into said grooves. In FIG. 8, the positions of the cross wires are indicated by dot-dash lines 5', while the body of rubber in which each magnet is imbedded prevents the accumulation of loose or loosened metal particles dislodged from the wire that would render the magnet ineffective.

CROSS WIRE FEED

Figure 7:
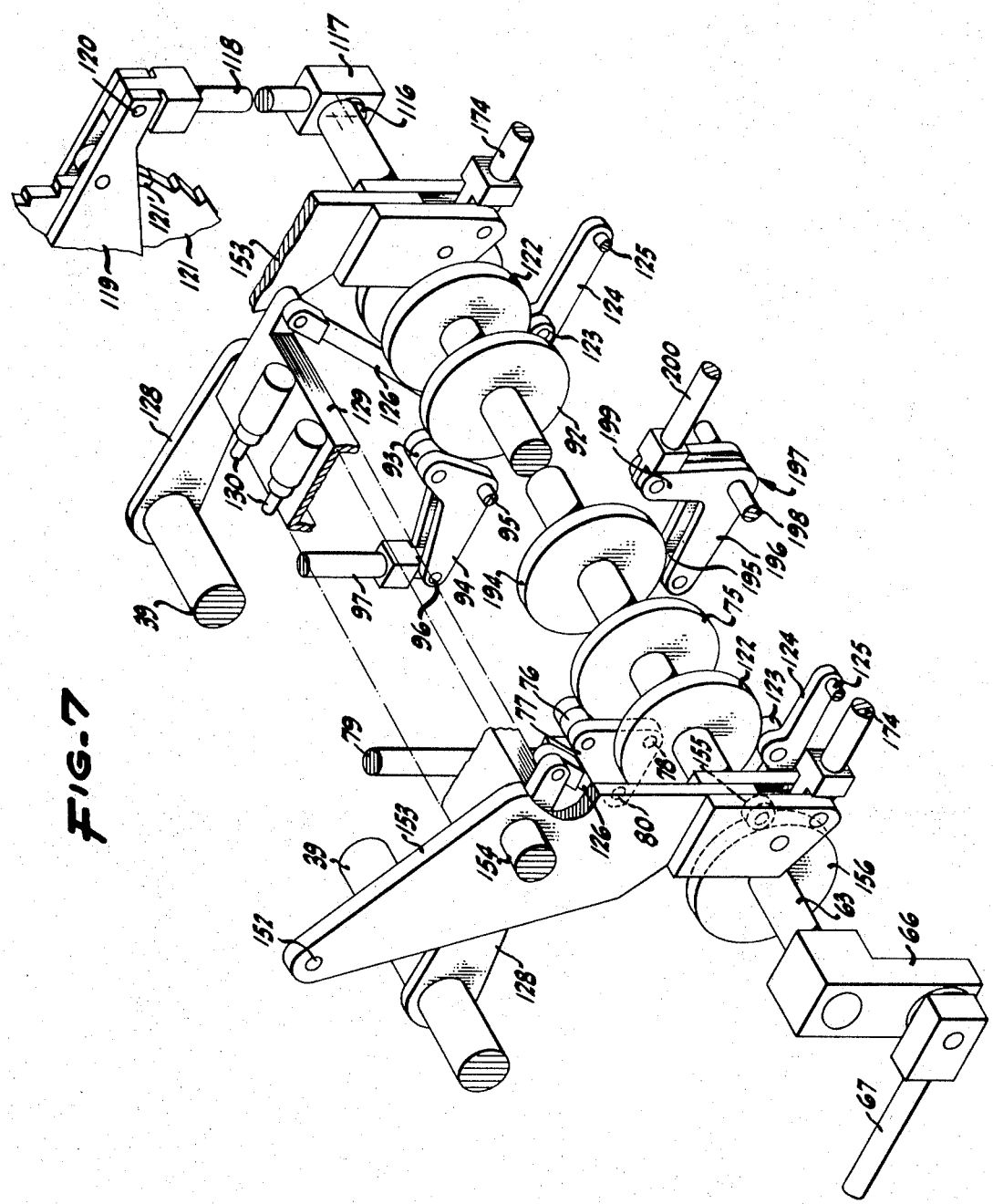
FIG. 7 is a fragmentary, exploded semidiagrammatic view showing the main drive shaft with the cams, and their followers being modified for purposes of clarity of explanation thereof and their showing in one view.

Referring to FIGS. 6, 7, a main shaft 63 is continuously driven in one direction by a motor 64 (FIG. 6) through a gearbox 65, and all movements stem from this shaft. A crank arm 66 (FIGS. 6, 7) in said shaft 63 is connected by a rod 67 with the outer end of a crank arm 68 that, in turn, is connected with the wire feed wheels 70 through an overrunning clutch and gears in a gearbox 71 to intermittently feed a length of wire 1 across a row of electrodes 50 (FIG. 10) on wheels 38 at the feed station 3 preparatory to cutting a cross wire 5 for engagement of said cross wire with magnets 58. The arm 68 will merely oscillate with each full revolution of crank arm 66.

Shaft 63 carries a cam 75 (FIG. 7) that is in engagement with a follower 76 on one end of a crank 77 that, in turn, is pivoted at 78 intermediate its ends to a stationary part of the machine, and a rod 79 is pivotally connected at 80 with the end of the crank opposite the follower.

Rod 79 extends upwardly from crank 77 (FIG. 6) and upon rotation of shaft 63 the rod 79 will be intermittently reciprocated longitudinally thereof under the influence of cam 75.

The upper end of rod 79 is pivotally connected at 81 (FIG. 6) with one end of a shear arm 82 that is pivoted at 83 to a fixed part of the machine. The opposite end of said shear arm 82 is provided with a guide opening 84 through which a cross wire 1 passes and is guided to a position extending across, but spaced from the outer periphery of drum 4 at the cutting station 3 (FIG. 10).

After the cross wire is fed through opening 83 to the aforesaid position at cutting station 3, it passes below a fixed shear 85 (FIG. 6) that is in shearing relation to the end of the shear arm 82 at opening 84. Follower 76 and cam 75 operate in timed relation to drum 4 to pivot the shear arm 82 for shearing the wire by shear 85 when the leading portion of said wire is in a position for being moved in a direction at a right angle to its length against a row of magnets on said drum. When so sheared, said leading portion is a cross wire 5 and is supported on a plate 88 (FIG. 10) on a cross frame member 89. Plate 88 is recessed at 90 (FIG. 11) along its edge that is to receive the rims 41 of the wheels 38 of drum 4 in spaced relation to said rims and the upper surface of said plate adjoining each recess adjacent its closed end is relieved slightly as at 91 (FIG. 11).

A cam 92 (FIG. 7), rigid on the main drive shaft 63 is in driving engagement with a follower 93 that is on one end of a crank 94. Crank 94 is pivoted at 95 to a fixed portion of the machine, and the opposite end of the crank 94 is pivotally connected at 96 with the lower end of a rod 97. Rod 97 extends upwardly from pivot 96 approximately parallel with rod 79, and its upper end is pivotally connected at 98 (FIGS. 6, 10) with one end of an arm 99 (FIG. 10) that extends generally laterally from a horizontally extending shaft 100, to which said one end of arm 99 is adjustably clamped.

Shaft 100 is journaled for rotation on a stationary portion of the machine, and said shaft as a plurality of upwardly projecting arms 101 adjustably clamped at their lower ends to said shaft (FIG. 10).

Pivotally secured to the upper end of each arm 101 is the inner end of a cross-wire shifting bar or a pusher bar 102. These pusher bars project from arms 101 toward the drum 4 and have free outer ends that are slidable on the upper surface of plate 88. Said bars 102 extend obliquely relative to plate 88 and is positioned in a vertical plane spaced between the electrodes of each pair. The outer free end portion of each bar 102 is formed with a notch 103 at its outer end opening both outwardly of said end portion, longitudinally of said bar and downwardly.

Alongside said bar and disposed between each adjacent pair of pusher bars 102 is a plate 104 having a forward portion overlying and supported on plate 88, and extending over a fulcrum member 105 at its rear end portion.

The words "forward," "forwardly," "rear," "rearwardly," and words of similar meaning used with respect to the wire shifting bars 102, and other elements associated therewith at the feed station 3, are used relative to the drum 4. Thus, the forward portion of plate 104 is the portion nearest the drum, while the rear portion is the part opposite thereto.

The forward portions of each of the plates 104 (FIG. 10a) are each formed with a downwardly opening recess 106 having a rear wall perpendicular to plate 88 and an upper wall 107 that is slanted downwardly and forwardly to the lower surface of each plate 104.

By this structure the surfaces of each recess 103 cooperate with the upper surface of plate 88 to provide a passageway in alignment with the opening 84 in the shear arm 82 for wire 5.

Plates 104 are each yieldably held against plate 88 and fulcrum member 105 by a washer 108 held on the upper end of a rod 109 that extends through cross frame member 89, which washer is yieldably held against the upper side of member 105 by a spring 110 that reacts between said frame member 89 and a nut on the lower end of said rod.

The rotation of cam 92 will cause the wire sifting arm 102 to reciprocate between a forward position and a rear position, and when in said rear position the notches 103 will be in alignment, axially of drum 4, with the recesses 106 (FIG. 10) and when the shaft 63 is actuated to feed wire 1 at the feed station 3, the wire will pass from opening 84 through the recesses 106 and past notches 103.

When arms 101, connected with pusher or cross-wire shifting bars 102, are actuated by cam 92 to swing the upper ends of arms 101 forwardly from the position shown in FIG. 10, after the wire is cut by shear 85, the pusher bars will slide the cross wire 5 across the upper surface of plate 88 to drum 4 and in so doing the forward end portions of plates 104 will be moved upwardly by engagement between the wire and slanted surfaces 107 of recesses 106. The rear sides of the recesses 106 will hold a wire in recesses 106 against movement rearwardly when the shift arms 102 move rearwardly and over said wire upon retraction of the shift arms. Springs 111 yieldably hold the outer ends of shift arms 103 downwardly against plate 88.

An element 112 (FIG. 10) pivoted at its rear end 113 at and positioned alongside each pusher or shift arm 103 extends forwardly toward drum 4 and rest at its forward end on the forward marginal portion of each plate 88 in the relieved part 90.

Upon each cross wire 5 being pushed from its position in recesses 104 to the drum 4 by the pusher bars 103 the wire will be moved out of said recesses 104 and on plate 88 past the outer ends of the elements 112, upon which said outer ends of elements 112 will be lifted to permit the passage of the wires 5 to magnets 58 which will hold the wires against a row of electrodes 50 in alignment with said magnets. The outer ends of elements 112 will automatically drop behind the wires that are so moved to magnets 58 to preclude any likelihood of their withdrawal by the pusher bars 103. The cross-wire shifting bars 103 must be offset to one side of electrodes to permit passing of wire to magnets.

PAPER FEED

The paper 6 from a roll 8 thereof may be prepunched to provide the slots 7 therein, or a conventional punch may be provided between roll 8 and the drum to intermittently form the slots 7 before the paper reaches the drum. In any event the paper from the roll has the slots formed therein before the paper reaches the drum, and this paper extends across the upper side of the drum 4 and is engaged in the slots by the hooks 55.

Figure 9:
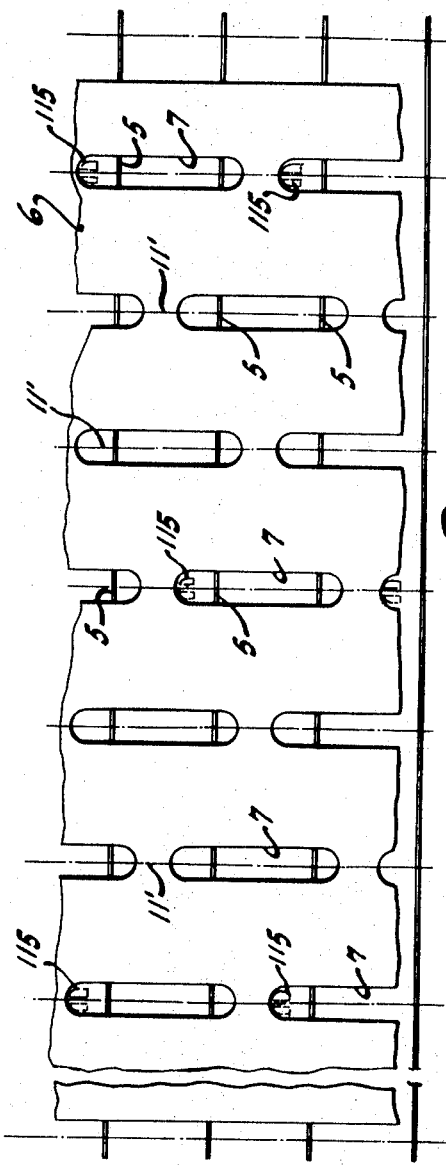
FIG. 9 is an enlarged, plan view of a portion of the paper fed onto the drum of FIG. 8 showing the cross wires in position under the paper.

Hooks 55, as previously explained, project radially outwardly relative to the axis of drum 4, and are positioned to engage the leading edge of the slots 6 through which they project. The leading edges of the hooks are preferably rounded as at 114 (FIG. 8) to correspond to the curvature of the forward edge of said slots so as not to tear the paper. These hooks are so distributed both axially and circumferentially of the drum so as to insure a substantially uniform application of tension to the sheet across its width, inasmuch as the rotation of the drum in the direction shown in FIGS. 1 and 13 will draw the strip 6 from the roll thereof; however, it is not necessary that a hook be provided for each of the slots, although a plurality of said hooks should be in slots 6 in each of the staggered rows. In FIG. 9 the position of the hooks in the slots is shown in dotted lines at 115 and said hooks are positioned between the leading cross wire 5 of the pair that extend across each slot and the single broken lines 11' in FIG. 9 shows the position of the longitudinal wires 1 that will be laid over the paper.

Paper 6 is arranged so that it will more or less drape across and in engagement with the outer peripheral surface of the drum 4 that faces upwardly and radially forwardly of the drum, said engagement being prior to the welding station 15. The word "forwardly" is used with respect to the direction of movement of the paper and rotation of the drum 4.

DRUM DRIVE AND LONGITUDINAL WIRE FEED AT WELDING STATION INCLUDING WIRE CLAMPS

An eccentric 116, rigid on the main drive shaft 63 (FIG. 7) is journaled for rotation in a block 117 that, in turn, is connected by a rod 118 (FIGS. 6, 7) with the outer ends of a pair of corresponding ratchet levers 119 by a pivot 120. The opposite end of said ratchet levers are rotatably supported on the shaft 39 that supports drum 4. Levers 119 are at opposite sides of a ratchet wheel 121 rigid on shaft 39, and a pawl 121' between levers 119 is pivotally connected with, and supported on the latter for engaging the teeth on said wheel 121. Upon rotation of shaft 63 the rod 118 will be reciprocated to intermittently rotate the drum 4 and all parts thereon a distance equal to the spacing between cross wires 5 that are on the drum 4.

Cams 122 (FIG. 7), rigid on and spaced from each other along the main drive shaft 63, are preferably box cams, each having a follower 123 in engagement therewith (FIG. 19). Each follower 123 is on a lever 124 that, in turn, is pivotally supported on a rigid part of the machine by a pivot 125, and the opposite ends of said levers are each pivotally connected to the lower end of a rod 126 (FIGS. 6, 7). By this structure, the reciprocable movement of the rods 126, and the oscillatory movement of the clamps 133 are controlled.

The upper end of rods 126 are pivotally connected at 127 to arms 218 (FIGS. 6, 7) that are rotatably supported at their inner ends for rotation about shaft 39 of the drum. The outer ends of arms 128 support a platform 129 (FIGS. 6, 7, 13) having a row of air cylinders 130 thereon, each of which cylinders has an air-actuated plunger having a wire engaging and clamping member 133 (FIGS. 6, 13 17) on its outer end in opposed relation to the respective electrodes 50 in a row thereof extending axially of the drum 4. The outer wire engaging end of each clamping member 133 is knurled (FIG. 13) or otherwise formed with a roughened surface to prevent slippage of the wire engaged thereby when said surface is in clamping engagement with a wire that extends across the electrode opposed thereto.

The longitudinal wires 1 extend over the cross wires 5 and paper 6 centrally of the slots 7 of the rows thereof extending longitudinally of the strip of paper 6, and aligning rollers 134 (FIG. 3) align the separate wires 11 from the several sources 2 with the annular rows of electrodes 50 on the drum. In addition, the majority of longitudinal wires extend between the pairs of paper-engaging hooks 55 in the annular rows of hooks on said drum. Assuming there are eight double rows of electrodes on the drum with two rows for each wheel, as described, the hooks may be on five of the rows that are on separate wheels and when this occurs, the hooks are equally spaced in each row around each wheel and each is directly secured to the rim 41 on only one of the two rims on the wheel.

A sprocket wheel 135 (FIG. 6) secured on shaft 63 is connected by a chain 136 with a sprocket wheel 137 on a timing shaft 138.

Said timing shaft 138 (FIGS. 6, 17) has a cam 139 thereon adapted to actuate a switch 139' in an electrical circuit 140 (FIG. 17) in which the solenoid 141 of a solenoid-actuated valve 142 is positioned. Valve 142 is connected by air lines 143, 144 with air manifolds 145, that are respectively connected by air lines 146, 147 with the opposite ends of the respective air cylinders 130.

A single row of outer electrodes 150 is positioned over the row of electrodes 50 that are adjacent to the row of clamping members 133, there being one outer electrode for each inner electrode, the latter being the electrodes on the drum 4.

A support 151 (FIG. 6) supports the bank or row of outer electrodes 150 and this support is pivotally supported at its ends by pivots 152 (FIGS. 6, 7) between the upper ends of a pair of upstanding arms 153. Said arms 153 are pivoted, intermediate their upper and lower ends on coaxial pivots 154 and the lower ends of said arms each carries a cam follower 155 (FIG. 7) in a position against a cam 156 that is rigid on the main drive shaft 63. Springs 157 (FIG. 6) respectively connected with each arm 153 and with a fixed portion of the machine below the pivot 154 yieldably holds each cam follower against one of the cams 156.

Two air cylinders 158 (FIG. 6) having air lines 159 connected with their ends are pivotally connected at 160 at one of their ends with brackets rigid on portions of arms 153 and plunger rods 162 project upwardly from the opposite end of the cylinders, which rods are pivotally connected at 163 with the support 151, for the outer electrodes 150. These air cylinders are normally inactive, and in their operating position, the support 151 will be held in the position shown in FIG. 6 in which the electrodes extend radially from the drum 4 or in directly opposed relation to the electrodes 50 of a row thereof on the drum. The air cylinders 158 are actuated only to tilt the row of electrodes 150 upwardly, clockwise as seen in FIG. 6, for servicing the latter.

Upon rotation of the main shaft 63 the arms 153 that carry the row of electrodes will be oscillated by cams 156 to move the outer electrodes 150 into tight welding relation to the longitudinal wires 1 at their crossing points with cross wires 5. This engagement will occur along one row of the electrodes 50.

A cam 165 on timing shaft 138 (FIG. 17) actuates a switch 166 that is in an electrical circuit 166' with a conventional weld timer 167 and with the electrodes, t energize the latter for welding the wires 1, 5 at their crossing points.

Immediately after each welding operation, the switch 139' is actuated to effect actuation of valve 142 to open lines 143, 146 to air underpressure for moving the clamping members 133 into clamping relation with the previously welded wires 1, 5 and under the influence of cams 122 and the drum driving means 119-125 and the wires 1, 5 welded at the electrodes 150 will advance the distance of the space between adjacent cross wires 5 and the clamping members will be released through actuation of valve 142 to return to their original positions, before said advance. The cycle will then be repeated, it being understood that the clamping members 133 will hold the wires together and against the electrodes until the outer electrodes are in firm engagement with the wires, but before the switch 166 is actuated, the clamping members are released and out of engagement with the wires. The clamping members then swing back to the broken line position 131 of crossing points previously welded.

The circuit for the outer electrodes is diagrammatically indicated in FIG. 12, in which the outer electrodes 150 for each pair of adjacent electrodes 50 on each rim 41 are connected in parallel with conductors 168, 169 in a step-down circuit from transformer 170 (FIG. 12), thus simultaneously welding together the wires 1, 5 at a pair of their crossing points.

The electrodes 150 on each wheel 38 are in series with the electrodes 50 therefor, and as the electrodes 50 are actuated only once during each revolution of the drum 4 or wheels 38, they will also function as heat dissipators during each welding operation, and the wear on electrodes 50 will be little compared with arrangements in which they are actuated with each welding operation. This is an important feature.

CUTOFF FOR PAPER-MESH ASSEMBLY

At the welding station 15, what has hereinbefore been referred to as the paper-mesh assembly, is formed, which assembly comprises the paper 6 held between the longitudinal wires 1 and the cross wires 5. This assembly is still in a continuous strip form, and after it has passed the welding station, the assembly strip may pass a furring and trimming station 173 (FIG. 3) where the longitudinal wires are kinked or bent through slots 7 to provide furring projections, and also the cross wires 5 that may project from the edges of the assembly may be trimmed off. The trimmer is a conventional shear and the furring device is a conventional punch-die that may be simultaneously actuated by connections with rods 174 (FIGS. 3, 6, 7) that, in turn, may be connected with the arms 153, for actuation by the same cam follower 155 that actuates the electrodes.

The leading portion of the paper-mesh assembly is cutoff by a vertically reciprocable shear blade 180 (FIG. 17) at shearing station 16 (FIG. 1) supported for vertical reciprocation in a position extending transversely across the continuous paper-mesh assembly that, in turn, is supported horizontally on a table 181 by a rigid frame 182 that includes guides for the blade. The plunger rod 183 of an air cylinder 184 (FIG. 17) is connected with said blade for effecting said vertical reciprocation, the blade 180 normally being held above the table and the continuous wire mesh assembly, and upon being driven downwardly past a stationary shear blade on the table, the leading portion 17 of the continuous wire mesh assembly is severed.

Figure 17:
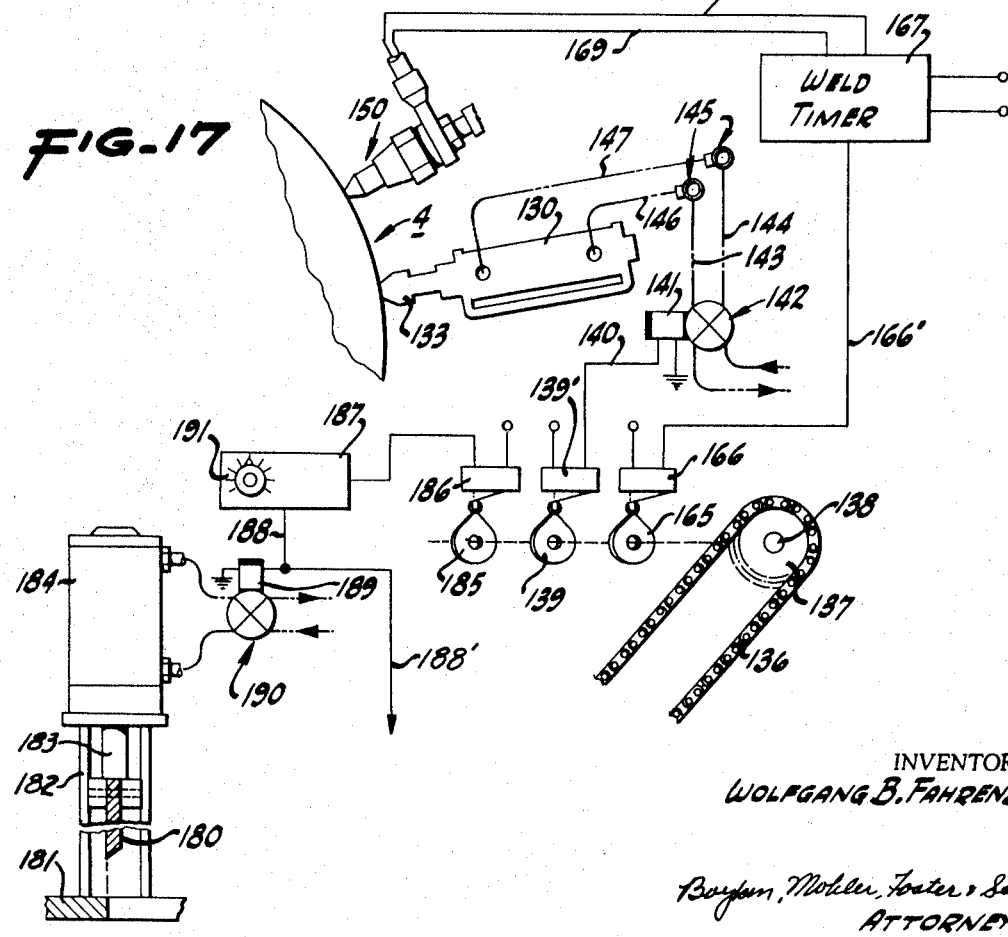
FIG. 17 is a fragmentary, elevational view, semidiagrammatically showing the control means for a welding electrode and the gripper adjacent thereto, and the counter control means for severing the paper -mesh assembly and for advancing the severed portion and back sheet assembly to provide the desired overhand of backing paper.

Referring to FIG. 17, a cam 185 on timer shaft 138 is adapted to actuate a switch 186 with each revolution of shaft 138, and the solenoid of a conventional electric counter 187 is actuated with each revolution of said shaft 138 to effect a step-by-step advance of a switch that will close a circuit 188 to the solenoid 189 of a solenoid-actuated valve 190 for admitting air underpressure to the upper end of said cylinder for driving the cutter downwardly to sever said leading portion of the wire mesh from the remainder, after which the blade is immediately raised automatically preparatory to another actuation. With each movement of the drive pawl 121' at ratchet wheel 121 in one direction, the paper-mesh strip will be moved the distance between a pair of adjacent cross wires 5, and it is seen that the length of each leading portion 17 that is cut from the continuous wire-mesh strip is determined by the manual adjustment of the counter 187, the different lengths being different multiples of the spacing between cross wires 5. A manually actuated dial 191 (FIG. 17) is provided on conventional counters for varying the number of impulses required to close the circuit.

At substantially the same time circuit 188 is closed, a solenoid valve 192 (FIG. 14) in a branch 188' of the same circuit and connected with air lines to the ends of a cylinder 193 is actuated for advancing the portion 17 immediately after the latter has been cut off from the remainder.

BACK PAPER ADVANCING MECHANISM AND GLUER

Figure 18:
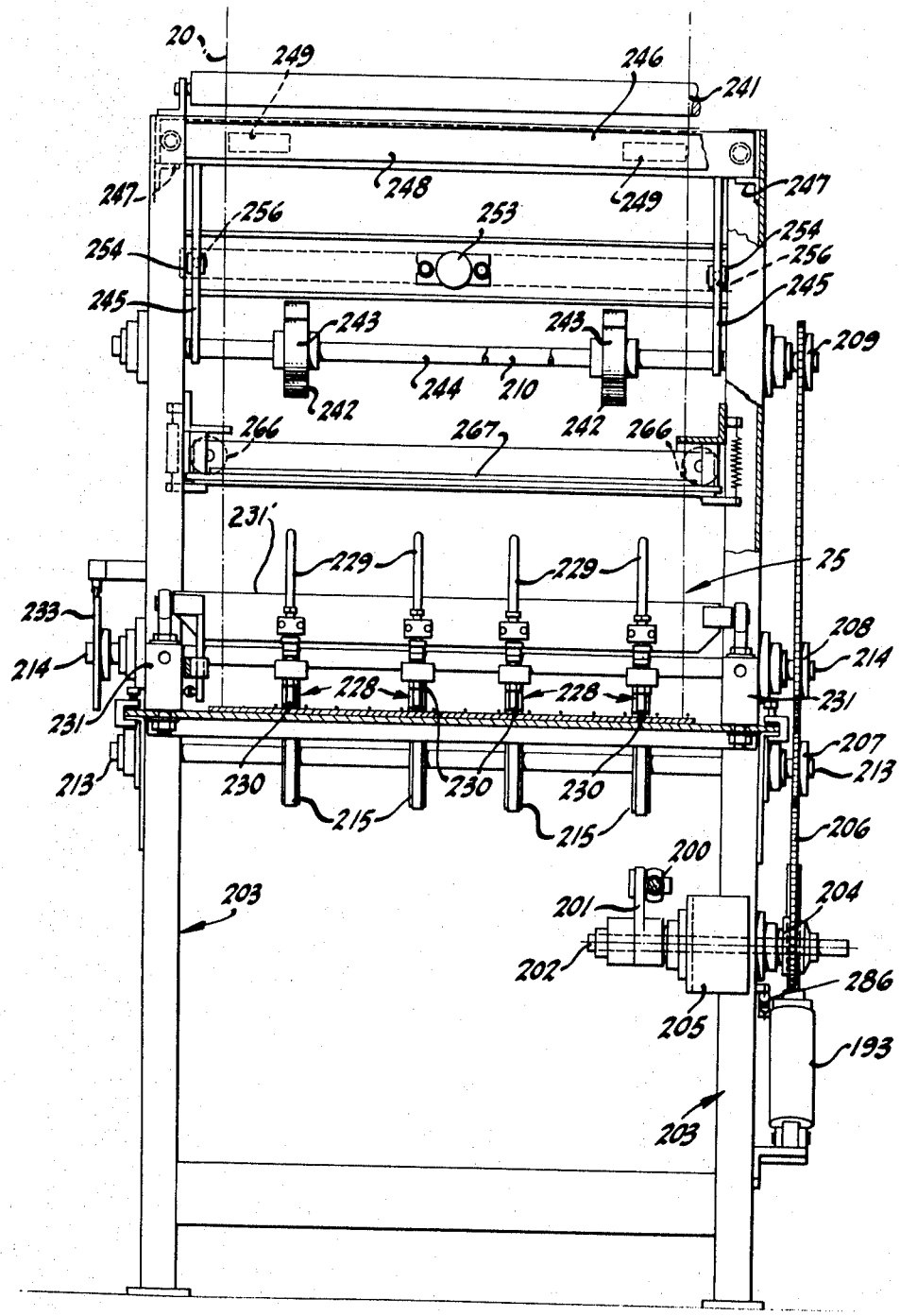
FIG. 18 is a view taken along line 18—18 of FIG. 14.

A cam 194 rigid on main shaft 63 (FIG. 7) is in engagement with a follower 195 that, in turn, is carried on the outer end of one crank arm 196 of a crank 197. Crank 197 is pivoted to a fixed portion of the machine at 198, and the other arm 199 of said crank 197 is pivotally connected to one end of a rod 200 (FIGS. 3, 14, 18).

Rod 200 is pivotally connected at its opposite end to the outer end of an arm 201 (FIGS. 14, 18) that, in turn, is secured at its opposite end to a shaft 202 that is supported for rotation in bearings on frame 203 of the portion of the machine carrying the gluer at the gluer station 25 and the paper advancing means at station 18.

A sprocket wheel 204 (FIG. 18) on shaft 202 is driven in one direction through a one-way clutch 205 (FIG. 18) upon one of each oscillation of shaft 200. A sprocket chain 206 (FIGS. 14, 18) extends around wheel 204 and one run of said chain successively extends upwardly past sprocket wheels 207, 208, and between said wheels to and over an upper sprocket wheel 209 on a shaft 210, and the other run of said chain extends downwardly and successively past and in engagement with a pair of idler sprocket wheels 211, 212.

Sprocket wheels 207, 208 are respectively secured on shafts 213, 214, the latter being uppermost, and the connection between said sprocket wheels and chain is such that upon downward movement of the run of the chain that is in engagement with said sprocket wheels, shafts 213, 214 will rotate oppositely, with the lower shaft 213 rotating clockwise, as seen in FIG. 14, and the upper shaft rotating counterclockwise. Clutch 205 is adapted to so drive said chain.

Shafts 213, 214 respectively, have pulleys 215, 216 thereon each of which support a pair of endless belts 217, 218, which belts also extend over pulleys 219, 220 (FIG. 14) that are on shafts 221, 222. These shafts are supported for rotation by bearings carried by frame 203, and belt tighteners 223 are operative on said bearings for maintaining the belts relatively taut, while rows of rollers 224, 225 respectively below and above the adjacent upper and lower runs of said belts 217, 218 yieldably urge said runs into engagement with each other for applying pressure to a paper-mesh assembly and backing sheet glued thereto, as will be described. Rollers 225 of the upper row are floatingly supported for downward movement by gravity against such assembly, while the lower rollers may be supported for rotation in fixed positions.

Portions 17 of the paper-mesh assemblies are fed between the belts at pulleys 215, 216.

Gluers 228 are of the conventional type each having a glue supply line 229 connected therewith (FIGS. 14, 15), and a vertically reciprocable glue applying nozzle 230 (FIG. 15) spring held in an upper closed position, and adapted to be moved downwardly to open, glue applying position under air admitted to cylinders 231 (FIG. 18) at the ends of a bar 231' that in turn are supported on the plunger of said cylinders 231. Air lines 232 from valve 235 admit air to the upper ends of said cylinders. The nozzles of said row are positioned to yieldably engage the paper 6 of the paper-mesh assembly that is moved therepast at points where portions of the paper are at the side of the wire-mesh adjacent to said gluer.

A cam 233 on shaft 214 (FIGS. 14, 15) actuates a microswitch 234 at timed intervals to energize a circuit to the solenoid of a valve 235 (FIG. 15) for admitting air to two cylinders 231 for driving said nozzles downwardly against paper 6 and for opening the needle valves of said nozzles to ejection of glue onto the paper, after which upon upward movement of the gluer the valve 235 closes and the nozzles are retracted until the next actuation of switch 234. Should the nozzles 230 tend to stick to the paper, the nozzle assembly is adapted to swing from vertical position against a stop 237 (FIG. 14), in the direction of movement of the paper until released, and it will then return under the influence of a spring 238 to its normal position against said stop.

An ejection of the glue occurs with each third or fourth intermittent advance of the paper-mesh assembly with the leading portion of such assembly between the belts 217, 218 at pulleys 215, 216, and the gluers are positioned relatively close to the driving belts 217, 218. Spots 239 (FIGS. 2 and 5) indicate where the glue is applied by one of the gluers.

The back paper 20 from source 21 extends downwardly from an idler roller 241 (FIGS. 14, 18) and past one side of coaxial rollers 242 on shaft 210, which shaft, in turn, is rotatably supported at its ends in bearings on frame 203. The side of the paper 20 opposite rollers 242 and at points opposite rollers 242, is adapted to be engaged by a pair of rollers 243 on a shaft 244, which shaft, in turn, is rotatably supported at its ends on the lower ends of a pair of corresponding arms 245.

The upper ends of arms 245 are secured to a horizontal cross bar 246 (FIG. 14) that is slidably supported at its ends on brackets 247 on frame 203 for horizontal movement.

The bar 246 and a transverse or horizontal upper frame member 248 are parallel and in opposed relation, and a pair of pinch bars 249 are adjacent each of the opposite ends of said bar 246 and frame member 248, between which the back paper 20 slidably extends, one bar 249 of each pair is on bar 246 and the other bar 249 is on frame member 248. A spring 250 reacting between a screw 251 that is adjustable on frame 203, and the bar 246 is adapted to apply the desired amount of friction to the paper 20.

Figure 16:
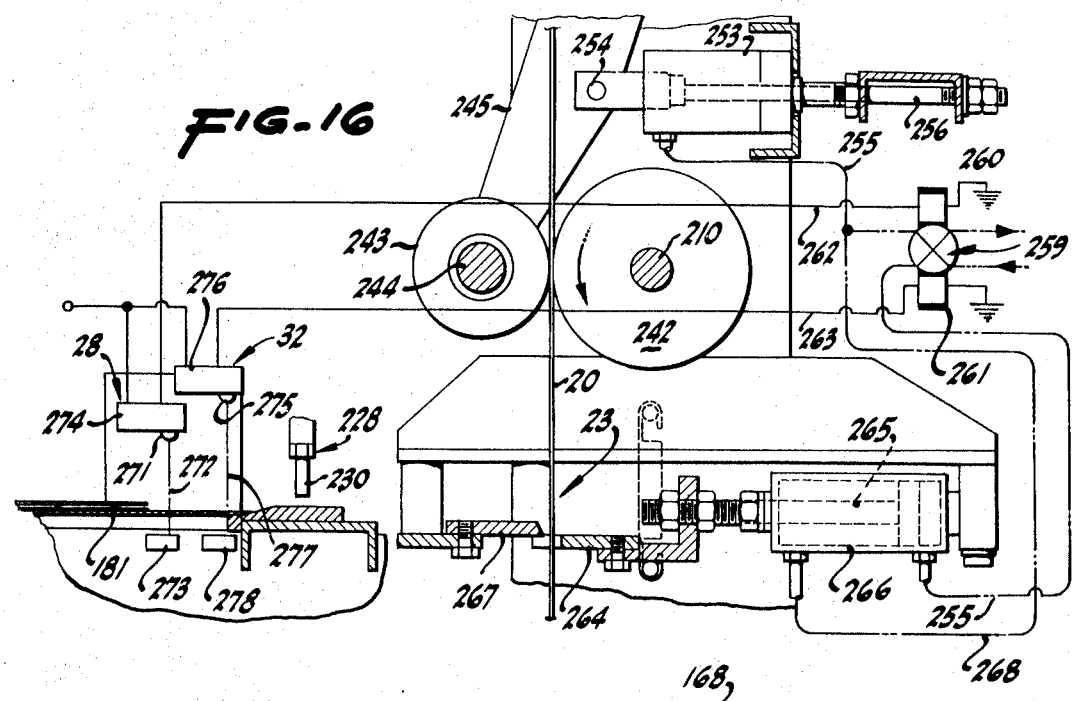
FIG. 16 is a fragmentary, enlarged, part sectional view showing the cutter for the back sheet and the control means for the cutter and for advancing the back sheet after the mesh-paper assembly has been cut by another cutter than the cutter for the back sheet, said other cutter being shown at a higher level than in the drawing in FIG. 14, to fit the sheet.

An air cylinder 253 (FIGS. 14, 16) is spaced above the rollers, which air cylinder includes a plunger connected by a pivot 254 with arms 245. Said cylinder is rigid on frame 201 and the stroke of its plunger is adjustable by an adjustable bolt 256.

Air underpressure is adapted to be admitted into cylinder 253 through air line 255 (FIG. 16) for moving arms 245 to move roller 243 against paper 20 with sufficient force to cause the paper to be driven downwardly by roller 242, and at the same time this movement of arms 245 will release the pinch bars 249 from gripping engagement with paper 20.

A solenoid-actuated valve 259 is actuatable by a pair of solenoids 260, 261, respectively in circuits 262, 263.

The back paper 20, after passing rollers 242, 243, passes past an open, air-actuated shear blade 264 (FIG. 16) at shearing station 23, which shear is connected with the plunger rod 265 of an air cylinder 266. Shear blade 264 is horizontally reciprocable relative to a stationary shear plate 267. Said cylinder 266 is double acting, one air line 268 being connected with air line 255 that leads from valve 259 to cylinder 253. Thus, when air is admitted to cylinder 253 for actuating roller 243 for driving the paper 20, the shear blade 267 is moved to open position to pass the paper.

It has been mentioned, it is important that the back paper 20 be fed so that its leading edge will register with the leading edge of the paper-mesh portion so that the marginal portions along said leading edges will be simultaneously engaged by belts 216, 217.

At the first sensing station 28, (FIG. 16) a photoelectric cell 271 is positioned to receive a beam 272 from a source 273 thereof, when nothing intervenes between cell 271 and source 273. When the passage of the beam is blocked, conventional wiring associated with said cell in box 274 is such that the solenoid 260 of valve 259, which is in circuit 262 with said cell, will actuate valve 259 to admit air to cylinders 253 and 266 for opening shear 264 and to move roller 243 to drive paper 20.

This blocking of beam 272 is by the leading edge of the continuous paper-mesh strip 26.

The counter 187 determines when the shear cylinder 184 is actuated, and also when the cylinder 193 is actuated so that leading portion 17 of the paper-mesh assembly will be severed and advanced to provide a gap 19 between said portion and the remainder 26 of the continuous paper mesh irrespective of the length of portions 17 as determined by the setting of dial 191 of the counter.

As long as beam 272 is blocked, the continuous paper-mesh assembly 26 will be advanced, while solenoid valves 190 and 192 will be automatically restored to positions for reactuation after the leading portion 17 is severed and advanced.

Adjacent to the photoelectric cell 271 and spaced from the latter in the direction of movement of the paper-mesh assembly a distance equal to the width of the extension 33 of the back paper (which width is a little less than the advance of portion 17 relative to remainder 26 after severance of portion 17 from said remainder), is a photoelectric cell 275 (FIG. 16) which is in circuit 263 with the solenoid 261 of valve 259, and the wiring of cell 275 in box 276 is such that when the light beam 277 from source 278 is unobstructed, the solenoid 261 will be actuated to move valve 257 to effect actuation of the cylinder 266 for shearing the cover or back sheet 20 and at the same time releasing the drive roller 243 and actuating the pinch bars 249 to grip the continuous remainder of paper 20 that leads to the shear.

The beam 277 is uncovered by passage of the trailing end of said portion past said light beam upon the advance of the leading portion 17 of the paper-mesh assembly.

The circuitry for these operations is conventional and too well known to those skilled in the art to be detailed in the drawings or by an expanded description.

As for the short, accelerated advance of the leading portion 17 to create the gap 19 and to form extension 33, the air cylinder 193 has air lines 281, 282 connected with solenoid valve 192. Plunger rod 283 projects upwardly from the upper end of said cylinder 193 and carries a toothed element 284 at its upper end, the teeth of which are adapted to engage the link pins of chain 206 for driving said chain upon upward movement of said plunger. This element engages the portion of chain 206 that extends upwardly from the lower sprocket wheel 204 to the lower idler sprocket wheel 211, and when this portion of the chain is driven upwardly, the adjacent runs of the pair of belts 217, 218 will be moved to the right to move the paper-mesh assembly in a direction away from the gluer. The upward movement of the toothed element 284 is rapid, thereby quickly moving the leading, severed portion 17 of the paper-mesh assembly away from the continuous remainder 26 that is at shear 180 at shearing station 16.

The lower end of cylinder 193 is pivoted at 285 to frame 203, for swinging the toothed element 284 into said driving engagement with the links of chain 206 and a spring 286 connects the upper end of cylinder 193 with frame 203 for yieldably urging said toothed element into said engagement with said chain.

The one-way clutch 205 prevents reverse movement of chain 206 when the plunger 283 is retracted upon solenoid valve 192 being actuated to move the plunger to its retracted position. The solenoid of valve 192 is deenergized immediately after its actuation and a conventional spring return automatically reverses the valve 192 to effect retraction of the plunger 283 after an upward movement of the latter.

The method of making the paper back lath may be briefly described as including the steps of laying a plurality of cross wires, horizontally, in succession, in a row in equally spaced, parallel, side-by-side relation for movement in one direction longitudinally of the row, and moving a continuous strip of paper having spaced parallel rows of openings therein extending longitudinally of said strip in spaced side-by-side relation in one direction longitudinally of said strip, and at the same time moving longitudinal wires in parallel side-by-side relation longitudinally of the latter at one side of said strip in positions respectively extending centrally across the openings in one of said rows thereof. The strip and said longitudinal wires are laid on top of the row of cross wires with the cross wires extending at right angles to said rows of openings and transversely across the openings of said rows with the longitudinal wires adjacent to said strip at the side of the latter opposite to said cross wires whereby the longitudinal and cross wires will cross each other at the openings of said rows.

As the strip and longitudinal wires are laid on the row of cross wires, longitudinal wires are aligned with the rows of openings by centering and holding a plurality of said longitudinal wires by projections extending through openings in different of said rows adjacent to the crossing points of the cross wires and longitudinal wires at said last-mentioned openings whereby the longitudinal wires cannot be out of alignment with said rows of openings and simultaneously moving said strip, cross wires and longitudinal wires in one direction along a path of travel extending longitudinal of said strip as a continuous assembly, and thereafter successively welding said cross wires to said longitudinal wires at their crossing points at a point along said path, and then severing the leading portion of said continuous assembly, relative to said direction of movement, from the continuous remainder thereof at uniform intervals to provide separate uniform lengths of said assembly with the ends of the longitudinal wires and the ends of the strip of paper of each assembly continuous.

In addition, the method may include the progressive feeding of a back paper from a continuous strip thereof on the assembly cut from the continuous assembly so that the leading edges of the back paper and the assembly cut from the continuous assembly are even or coterminous, while the back paper will be cut so that its trailing portion will extend beyond the trailing edge of the cut assembly.

The elimination of handling separate sheets of perforated paper as heretofore practiced, and the laying of the longitudinal wires over the paper sheet and prelaid cross wires, instead of feeding the cross wires over prelaid longitudinal wires and paper, plus the steps in the present invention of centering and holding the longitudinal wires relative to the openings in the rows thereof, insures against defective finished paper back lath due to misalignment of the longitudinal wires. The thrusting of cross wires across paper and openings therein through which prelaid longitudinal wires are exposed is not satisfactory.

The machine itself is adapted to carry out the method described, and in addition, the paper back mesh may be produced in any length and later cut into usable sections, if desired, or sections of the correct length of standard or unusual lathing jobs may be readily produced, including paper back lath having the back sheet as hereinbefore described.

Heretofore, attempts to vary the length of the lath have depended upon controlling the relative speeds between switch trips driven by the lath making machine and the speed of the making the lath itself. With the present invention, a simple conventional counter for the cross wire welds accurately determines the length of each finished cut lath.

Also, heretofore, each welding operation for each cross wire has involved the operation of all electrodes, where as in the present invention, only the hot electrodes are employed with each operation, the hot electrodes being the outer electrodes 150 and the inner electrodes are on coaxial wheels 38 that serve as conductors for the series connection of the hot electrodes and that serve as heat dissipators, the latter acting as such conductors only once during each revolution of the wheels.

In the claims the use of the term "hot electrodes" refers to electrodes 150, while the term "conductor electrodes" refers to the electrodes on each wheel 38, and the word "driven" refers to the assembly of wheels 38 and their electrodes.

It is to be understood that the foregoing detailed description is the preferred embodiment of the invention and that modifications may be made therein within the scope of the claims and without departing from the scope of the invention.

I claim:

1. A machine for making paper back lath of the type comprising a sheet of paper having a plurality of parallel spaced rows of opening formed therein, and parallel longitudinal wires at one side of said sheet extending longitudinally of said rows across the openings in said sheet, and cross wires at right angles to said longitudinal wires welded to the latter through said openings, comprising;

a. wire and paper supporting means for supporting thereon a row of spaced cross wires in side-by-side relation, together with a continuous apertured sheet of paper against said cross wires and a row of continuous parallel longitudinal wires against the side of said strip that is opposite said cross wires with said paper being formed with rows of openings parallel with said strip and with said longitudinal wires and said cross wires extending at right angles to said longitudinal wires and crossing said openings, b. a row of hot welding electrodes parallel with said cross wires extending across one side of said supporting means adjacent thereto but spaced therefrom for passage of said cross wires, sheet, and longitudinal wires therepast in a direction longitudinally of said strip and cross wires and transversely of said row of hot welding electrodes, c. said wire and paper supporting means including a plurality of rows of conductor welding electrodes in spaced, parallel, side-by-side relation with said row of hot welding electrodes, d. means supporting said wire and paper supporting means, including said rows of conductor electrodes and said cross wires, strip and longitudinal wires, for movement together past said row of hot electrodes at a passing point with said conductor electrodes of each row thereof in approximately opposed relation to said hot electrodes at said point and with the crossing points of one of said cross wires with said longitudinal wires at said openings in said strip between the opposed conductor and hot electrodes, and means connected with said wire and paper supporting means for moving it in one direction, e. electrode moving means for moving said hot electrodes into engagement with said longitudinal wires at said crossing points for welding said longitudinal wires and cross wires together in said openings upon movement of each row of conductor electrodes to said passing point for forming a continuous assembly of a continuous strip of wire mesh continuous longitudinally extending wires extending longitudinally of a continuous perforated strip of paper at one side thereof and cross wires at the opposite side of said strip welding to said longitudinal wires through the perforations in said continuous strip of paper.

2. In a machine as defined in claim 1;
f. said conductor electrodes being connected in series with said hot electrodes during each welding operation, and said hot electrodes being connected in parallel with the source of electricity.

3. In a machine as defined in claim 1,
f. paper-engaging means on said wire and paper supporting means movable therewith projecting through said openings in different of said rows thereof and into engagement with the leading edges of said openings for moving said paper therewith in one direction with movement of said wire and paper supporting means when said paper, cross wires and longitudinal wires are supported thereon.

4. In a machine as defined in claim 3;
g. said paper-engaging means including wire aligning means movable into engagement with the longitudinal wires extending over the rows of openings through which said paper-engaging means extends for aligning said longitudinal wires with said openings, centrally thereof.

5. In a machine as defined in claim 1;
f. said wire and paper supporting means comprising a plurality of coaxial wheels having outer peripheral annular surfaces relatively close together substantially providing a cylindrical drum secured on a central rotatably supported shaft,
g. cross wire holding means equally spaced around the outer periphery of said drum for releasably holding said cross wires on said drum for movement therewith,
h. said conductor electrodes being carried on said drum for movement therewith, and equally spaced apart around the outer periphery of the latter the same distance as the spacing between said cross wire holding means.

6. In a machine as defined in claim 5;
i. wire and paper positioning means for supporting said paper in a continuous strip and said longitudinal wires in a position extending across and in engagement with a circumferentially extending portion of the outer periphery of said drum with said paper over and against the cross wires adapted to be held by said cross wire holding means at said portion of said drum.

7. In a machine as defined in claim 6;
j. wire clamping means adjacent to and spaced outwardly of the outer periphery of said portion of said drum over said crossing points between the cross wires and longitudinal wires and adapted to be supported over said portion of said drum for movement into firm engagement with said longitudinal wires for holding them and the cross wire at said points to said drum during each movement of the latter in said one direction for moving said longitudinal and cross wires to a position between said hot and conductor electrodes for welding, and
k. actuating means for intermittently actuating said means for moving said wire and paper supporting means intermittently in said one direction a distance equal to the distance between the adjacent cross wires adapted to be supported on said wire and paper supporting means during each such movement.

8. In a machine as defined in claim 1;
f. assembly supporting means for supporting said continuous assembly of longitudinal wires, paper and cross wires for movement longitudinally of said assembly in a direction away from said wire and paper supporting means,
g. actuating means for intermittently actuating said means for moving said wire and paper supporting means and said assembly, intermittently, in said one direction a distance equal to the distance between the adjacent cross wires adapted to be supported on said wire and paper supporting means, during each such movement,
h. cutting means adjacent to said assembly supporting means for periodically, at equal intervals, severing the leading portion of an assembly on said assembly supporting means, relative to the direction of movement of said assembly,
i. control means operatively connected with said assembly supporting means and said cutting means, for actuating said cutting means to so sever said leading portion upon a predetermined number of intermittent movements of said wire and supporting means, whereby the length of the said leading portion so cut will be equal in length to a multiple of the distance between the cross wires of an adjacent pair thereof.

9. In a machine as defined in claim 8;
j. assembly moving means adjacent to said assembly supporting means and to the leading portion of said assembly that is adapted to be severed from said continuous assembly, in driving engagement with said severed portion operatively connected with said means for moving said wire and paper supporting means for moving the leading portion of said assembly so severed, longitudinally of said continuous assembly away therefrom, for a predetermined interval of time at an accelerated rate of movement relative to the rate of movement of said continuous assembly for forming a gap of predetermined width between said leading portion and said continuous assembly,
k. means for supporting a strip of continuous back paper in the form of a strip having a free leading edge, for movement to a position flat over said leading portion of said assembly with said leading edge of said back strip in register with the leading edge of said assembly and in engagement with said assembly moving means for movement of said back strip with said assembly,
l. a back-paper severing means for severing the leading portion of said back paper relative to the direction of movement thereof from the remainder thereof,
m. back-paper moving means at the side of said severing means opposite to said leading portion which said severing means is actuated for severing said leading portion in engagement with said continuous back paper for driving the latter to and past said back-paper severing means, and
n. control means for automatically actuating said back-paper severing means periodically for severing said back paper at a distance from the leading edge thereof that is greater than the length of the leading portion of said assembly, whereby the trailing part of said leading portion of said back paper will extend across the gap between the leading portion of said assembly and the following continuous part thereof, and
o. gluing means for gluing the paper of said leading portion of said assembly to said leading portion of said back paper.

10. In a machine as defined in claim 9;
p. means operatively connected with the means for moving said wire and paper-supporting means for bending the longitudinal wires of the mesh of said continuous assembly to one side of the plane of the latter at spaced points along the length of said assembly, and for trimming off the ends of said cross wires that may project outwardly of the paper of said continuous assembly.

11. A machine for making paper back lath of the type comprising a continuous strip of paper having a plurality of parallel, spaced rows of openings formed therein extending longitudinally of said strip, and parallel longitudinal wires at one side of said strip extending longitudinally of said rows across the openings in said strip, and cross wires at right angles to said longitudinal wires welded to the latter through said openings, the combination of:

a. a rotary drum supported for rotation about a horizontal axis,
b. wire and paper supporting and positioning means on said drum for supporting said longitudinal wires, strip of paper and cross wires on said drum with said cross wires and paper against the outer periphery of said drum and said longitudinal wires outermost but in the aforementioned relation and with the crossing points of said longitudinal and cross wires at each of said openings,
c. drum moving means connected with said drum for intermittently rotating said drum in one direction,
d. holding means for holding said longitudinal wires, strip of paper and cross wires to said drum for intermittent movement thereof in a direction longitudinally of said longitudinal wires,
e. welding means stationary relative to rotational movement of said drum for welding said longitudinal wires and cross wires together at a point around said drum between each intermittent movement of said drum forming a unitary assembly of said longitudinal and cross wires with said paper therebetween,
f. means for supporting said assembly for movement longitudinally thereof away from said drum in a horizontally extending path of travel,
g. means for severing the leading portion of said assembly relative to the direction of movement thereof from the continuous remainder thereof at equal periodic intervals to provide severed portions of said assembly of equal length,
h. means for moving a continuous back strip longitudinally thereof onto said leading portion of said assembly at the same rate of speed as the latter with the leading edge of said back strip substantially even with the leading edge of said leading portion, at a point beyond said means for severing said leading portion from said assembly in the direction of movement of said assembly,
i. means for severing the leading portion of said back strip from the continuous remainder thereof at a point along said back strip that is a greater distance therealong from the leading edge thereof than the length of said assembly whereby the trailing edge of said back strip will project beyond the trailing edge of the leading portion of said assembly after severance thereof from the continuous remainder of said assembly, and
j. means for gluing said leading portion of said back strip to the paper of said assembly during movement of said leading portion of said back strip and the leading portion of said assembly together.

12. In a machine as defined in claim 8;

j. said assembly supporting means supporting said continuous assembly for said movement longitudinally of the latter in a position with said longitudinal wires uppermost, and means for supporting a strip of continuous back paper for movement in the same direction as said movement of said continuous assembly to a position overlying the latter and against said longitudinal wires during said movement of said continuous assembly,
k. means for positioning said continuous strip of back paper over said assembly with the leading edge of said back paper substantially in register with the leading edge of said assembly,
l. means for gluing said strip of back paper to said assembly at spaced points each disposed between a different adjacent pair of cross wires,
m. severing means for severing said strip of back paper transversely thereof in sections of greater length longitudinally of said strip of back paper than the sections of said assembly strip for projection of a portion of each section of back paper outwardly of and beyond the end of each section of said assembly that is opposite to its leading end.

* * * * *